(No Model.)

C. H. O. HAMANN.
DRIVING MECHANISM FOR PROPULSION WHEELS.

No. 564,194. Patented July 21, 1896.

Witnesses:

Inventor:
Carl H. O. Hamann.

UNITED STATES PATENT OFFICE.

CARL HEINRICH OTTO HAMANN, OF BERGEDORF, GERMANY.

DRIVING MECHANISM FOR PROPULSION-WHEELS.

SPECIFICATION forming part of Letters Patent No. 564,194, dated July 21, 1896.

Application filed August 14, 1895. Serial No. 559,263. (No model.)

*To all whom it may concern:*

Be it known that I, CARL HEINRICH OTTO HAMANN, a subject of the German Emperor, and a resident of Bergedorf, near Hamburg, in the German Empire, have invented certain new and useful Improvements in Driving Mechanism for Propulsion-Wheels, of which the following is a specification.

This invention relates to improvements in driving mechanism for propulsion-wheels, particularly applicable for velocipedes, in which latter case the invention is designed to advantageously replace the commonly-employed chain-gear for uniformly transmitting the motion of the pedal-shaft to the driving or propulsion wheel.

In the accompanying drawings the invention is illustrated by way of example in connection with a velocipede, in which—

Figure 1:
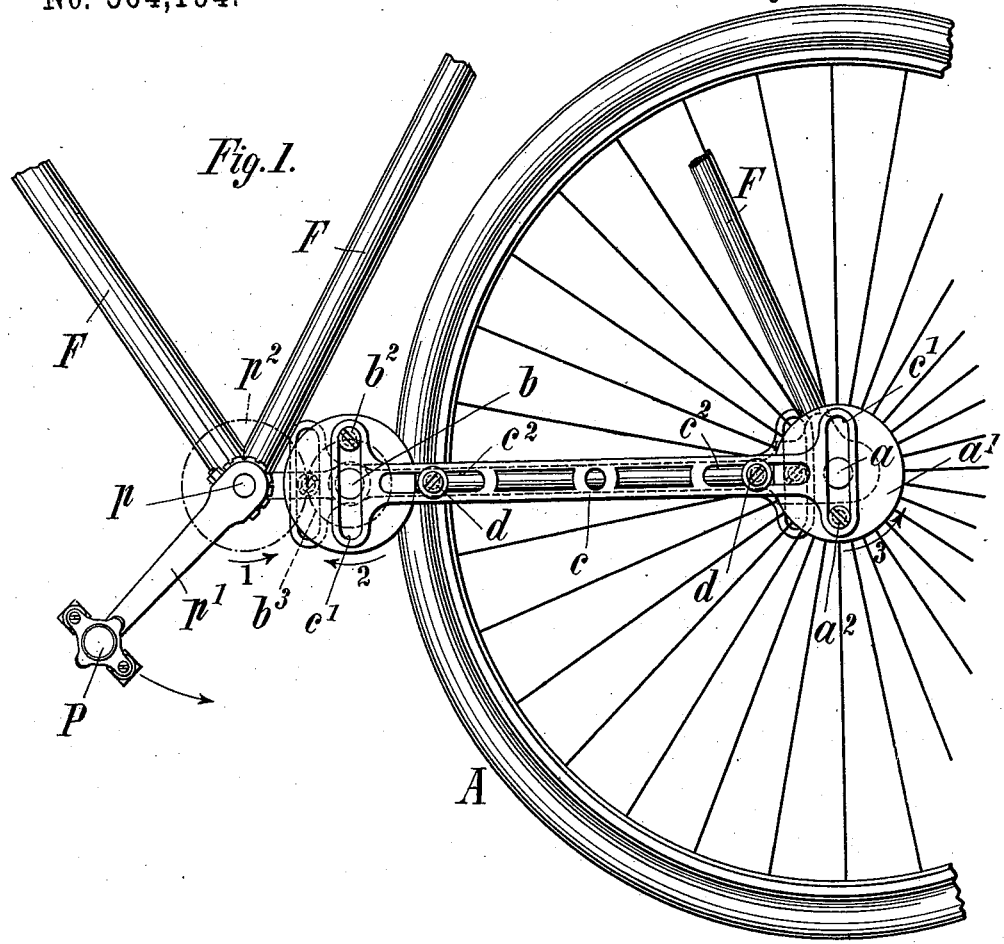
Figure 2:
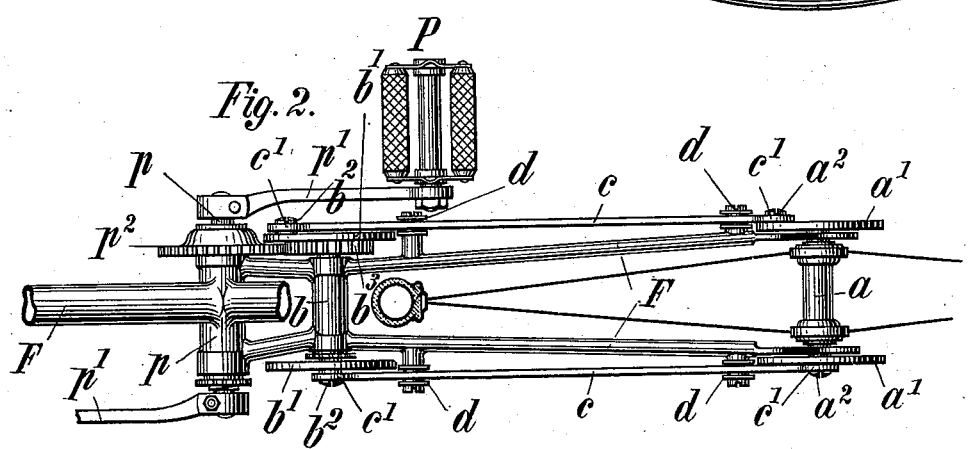

Figure 1 is a side elevation showing parts of a bicycle of the well-known safety type, with the improvements applied thereto. Fig. 2 is a top view, partly in section, of Fig. 1.

Similar letters refer to similar parts throughout the several views.

The letter F designates the frame of the bicycle, which may be of any suitable form or construction; A, the rear driving or propulsion-wheel; P, the pedals, and $p$ the pedal crank-shaft, provided with the usual cranks $p'$ and a pinion $p^2$.

The axle or shaft $a$ of the propulsion-wheel A is journaled between the rear fork of the frame and provided at each extremity with a suitable crank or crank-disk $a'$, having a crank-pin $a^2$, the pins $a^2$ of the cranks $a'$ being placed at right angles to each other.

Between the pedal crank-shaft $p$ and the axle $a$ is arranged a second shaft $b$ suitably journaled in the frame and provided at each end with a crank or crank-disk $b'$, the pins $b^2$ of which being also arranged at right angles to each other. This crank-shaft, moreover, is provided with a toothed wheel $b^3$ meshing with the teeth of the pinion $p^2$ of the pedal crank-shaft $p$, so that power applied to the pedals P to rotate the shaft $p$ is transmitted to the shaft $b$ by means of the said wheels $p^2\ b^3$, and according to the proportion of their diameters.

The corresponding cranks $a'$ and $b'$ at each side of the bicycle are connected with each other by means of horizontally-reciprocated guide-rods $c$ having at their extremities suitably-shaped loops $c'\ c'$ arranged at right angles to the race of the rod $c$ and into which engage the respective crank-pins $a^2\ b^2$, the rods $c$ being preferably guided by means of guide-rollers $d$ attached to the frame and adapted to slide within suitable longitudinal slots $c^2$ of the guide-rods $c$, to which latter, on rotation of the shaft $b$, horizontally-reciprocating motion is imparted.

The operation of the described driving mechanism will be as follows: If, for instance, on actuating the pedals P the shaft $p$ is turned in the direction of the arrow 1, Fig. 1, the crank-shaft $b$ is rotated in the direction indicated by the arrow 2. Thereby either of the crank-pins $b^2$ moving in a circle imparts reciprocating motion to the corresponding rod $c$ in such a manner that the to-and-fro motion of either rod takes place in a sense opposite to that of the other rod. Thus both rods $c$ uniformly transmit the motion of the cranks $b'$ to the cranks $a'$ in the opposite sense—that is to say, the direction of rotation of the shaft $a$ will be reversed in relation to the motion of the shaft $b$, as indicated by the arrow 3, as is required when employing the customary pedal mechanism in bicycles, in order to rotate the propulsion-wheel in the prescribed sense.

From the foregoing it will be seen that the mechanism above described may be used in several kinds of machinery employing crank-gearing whenever it is required to uniformly transmit the motion of one crank to the other and to reverse the direction of rotation of the driven shaft in relation to the driving-shaft.

Having fully described my invention, what I desire to claim and secure by Letters Patent is—

In a cycle, means for transmitting power from the pedal-shaft to the drive-wheel axle and revolving both in the same direction, consisting in the combination with the wheel-axle provided with a crank at each end, a transmitting-shaft likewise provided with a crank at each end and connecting-rods provided with slotted heads $c'$ connecting the cranks on said shafts, said cranks set to reciprocate the rods in opposite directions, of the pedal-shaft and gearing connecting said shaft with the transmitting-shaft, substantially as set forth.

In testimony that I claim the foregoing as my invention I have signed my name, in presence of two witnesses, this 2d day of August, 1895.

CARL HEINRICH OTTO HAMANN.

Witnesses:
 ALEXANDER SPECHT,
 JULIUS STRICKENBERG.